US012562425B2

(12) United States Patent
Taniuchi et al.

(10) Patent No.: US 12,562,425 B2
(45) Date of Patent: Feb. 24, 2026

(54) BATTERY PACK

(71) Applicant: HONDA MOTOR CO., LTD., Tokyo (JP)

(72) Inventors: Takuya Taniuchi, Wako (JP); Toshiyuki Ariga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 539 days.

(21) Appl. No.: 18/125,847

(22) Filed: Mar. 24, 2023

(65) Prior Publication Data

US 2023/0318107 A1     Oct. 5, 2023

(30) Foreign Application Priority Data

Mar. 31, 2022     (JP) ................................. 2022-060272

(51) Int. Cl.
*H01M 50/242*     (2021.01)
*H01M 50/249*     (2021.01)

(52) U.S. Cl.
CPC ....... *H01M 50/242* (2021.01); *H01M 50/249* (2021.01)

(58) Field of Classification Search
CPC .................................................. H01M 50/242
See application file for complete search history.

(56) References Cited

U.S. PATENT DOCUMENTS

| | | | | |
|---|---|---|---|---|
| 8,572,849 | B1 * | 11/2013 | Clark | ...................... F16M 11/14 403/53 |
| 2015/0303420 | A1 | 10/2015 | Watanabe et al. | |
| 2019/0341589 | A1 | 11/2019 | Kato | |
| 2020/0295320 | A1 | 9/2020 | Harada et al. | |

FOREIGN PATENT DOCUMENTS

| | | |
|---|---|---|
| CN | 215911452 | 2/2022 |
| JP | 2019-160693 | 9/2019 |
| JP | 2019-194957 | 11/2019 |
| JP | 2021-096989 | 6/2021 |
| WO | 2014/083599 | 6/2014 |
| WO | 2019/073518 | 4/2019 |

OTHER PUBLICATIONS

Japanese Office Action for Japanese Patent Application No. 2022-060272 mailed Oct. 21, 2025.

* cited by examiner

*Primary Examiner* — Jonathan G Jelsma
(74) *Attorney, Agent, or Firm* — Amin, Turocy & Watson, LLP

(57)     ABSTRACT
A battery pack of the present invention includes a stacked body of a plurality of solid state battery cells, end plates connected to both ends of the stacked body in a stacking direction, first wall members connected to the end plates on the both ends via a first self-centering mechanism, respectively, and a support member configured to support the first wall member, the first self-centering mechanism being constituted by a spherical member and two plate-shaped members slidable on a surface of the spherical member, one of the plate-shaped member being connected to the end plate, and other one of the plate-shaped member being connected to the first wall member.

10 Claims, 6 Drawing Sheets

BATTERY PACK

CROSS-REFERENCE TO RELATED APPLICATION

Priority is claimed on Japanese Patent Application No. 2022-060272, filed Mar. 31, 2022, the content of which is incorporated herein by reference.

BACKGROUND OF THE INVENTION

Field of the Invention

The present invention relates to a battery pack.

Description of Related Art

In recent years, in order to ensure access to affordable, reliable, sustainable and advanced energy for more people, research and development has been carried out on secondary batteries that contribute to energy efficiency. In the vehicles that have been developed in recent years, a battery module that constitutes a general electronic instrument is mounted in a state of a battery pack attached to a pack.

In the battery pack with a secondary battery cell, the following problems are present. In the battery pack mounted on a vehicle, a battery module pressurized by vibrations of the vehicle is likely to bend or twist, and a secondary battery cell that constitutes the battery module may be damaged.

Japanese Unexamined Patent Application, First Publication No. 2021-096989 discloses a technology of suppressing occurrence of bending even in a state in which a stacked body of secondary battery cells that constitute a battery module (cell stack) is pressurized in a stacking direction. This technology is realized by providing an inclination to a surface of a claw member that pushes both ends of the stacked body and absorbing expansion of the stacked body on a pack side.

SUMMARY OF THE INVENTION

In the technology of Japanese Unexamined Patent Application, First Publication No. 2021-096989, the bending protruding on the pack side of the battery module is suppressed forcibly. For this reason, a large load is applied to the secondary battery cell that constitutes the battery module, and the secondary battery cell may be damaged. In addition, in the technology disclosed in Japanese Unexamined Patent Application, First Publication No. 2021-096989, while bending protruding on the pack side of the battery module can be suppressed, it is difficult to suppress bending on the other side.

An aspect of the present invention is directed to providing a battery pack capable of suppressing bending or twisting of a battery module over all directions without imposing a load on a secondary battery cell. Then, an aspect of the present invention is to contribute to efficiency of energy.

An aspect of the present invention employs the following configurations.

(1) A battery pack according to an aspect of the present invention includes a stacked body of a plurality of solid state battery cells; end plates connected to both ends of the stacked body in a stacking direction, respectively; first wall members connected to the end plates on both ends via a first self-centering mechanism, respectively; and a support member configured to support the first wall member, the first self-centering mechanism being constituted by a spherical member and two plate-shaped members slidable on a surface of the spherical member, one of the plate-shaped member being connected to the end plate, and other one of the plate-shaped member being connected to the first wall member.

According to the configuration, the stacked body of the solid state battery cells is fixed to the fixing member such as the first wall member, the support member, or the like, via the first self-centering mechanism. Accordingly, since the stacked body is in point contact with the fixing member, attenuation of bending or undulation of the stacked body due to expansion or the like of the solid state battery cells can be suppressed in all directions.

In addition, according to the configuration, since the pressure due to twisting or the like transmitted from the side of the fixing member is equalized via the first self-centering mechanism and the equal pressure is applied to the stacked body from any angle, a state in which a large load is not applied to the solid state battery cells can be realized.

(2) In the battery pack according to the above-mentioned (1), protrusions protruding from the end plates or the first wall members may be provided between the end plates and the first wall members.

According to the configuration, since the protrusions are provided, the end plates approaching the first wall members when the stacked body is bent is able to be suppressed, and as a result, it is possible to suppress excessive bending of the stacked body.

(3) In the battery pack according to the above-mentioned (2), the protrusions may be provided on a side opposite to the support member while having the first self-centering mechanism sandwiched therebetween.

According to the configuration, since the protrusions are provided on the side that is expected to bend relatively the most, the effect of suppressing excessive bending can be maximized.

(4) In the battery pack according to the above-mentioned (2) or (3), a tip surface of the protrusion may separate away from a rear end surface of the protrusion as the tip surface approaches the support member.

According to the configuration, when the stacked body is bent, the entire tip surface of the protrusion can come into surface contact with the end plate or the first wall member that approaches the protrusion. Since a contact area of the protrusion with the end plate or the first wall member can be increased, excessive bending of the stacked body can be suppressed in a stable state.

(5) In the battery pack according to any one of the above-mentioned (2) to (4), the stacked body and the end plate may be separated from the support member.

According to the configuration, undulation of the stacked body due to volume expansion or the like of the solid state battery cells is not disturbed by the contact with the support member. Accordingly, when the undulation of the stacked body is disturbed, it is possible to avoid the problem that stress occurs in the solid state battery cells in the stacked body and the solid state battery cells are damaged.

(6) A battery pack according to another aspect of the present invention includes a stacked body of a plurality of solid state battery cells; second wall members connected to both ends of the stacked body in a stacking direction, respectively; end plates connected to the second wall members on both ends via a second self-centering mechanism, respectively; first wall members connected to the end plates; and a support member configured to support the first wall members, the second self-centering mechanism being constituted by a spherical member and two plate-shaped members slidable on a surface of the spherical member, one of the plate-shaped member being connected to the second wall member, and other one of the plate-shaped member being connected to the end plate.

According to the configuration, the stacked body of the solid state battery cells is fixed to the fixing member such as the first wall member, the support member, or the like, via the second self-centering mechanism. Accordingly, since the stacked body is in point contact with the fixing member, bending or undulation of the stacked body due to expansion or the like of the solid state battery cell can be suppressed by being attenuated in all directions.

In addition, according to the configuration, since the pressure due to twisting or the like transmitted from the side of the fixing member is equalized via the second self-centering mechanism and the equal pressure is applied to the stacked body from any angle, a state in which a large load is not applied to the solid state battery cells can be realized.

(7) In the battery pack according to the above-mentioned (6), protrusions protruding from the second wall members or the end plates may be provided between the second wall members and the end plates.

According to the configuration, since the protrusions are provided, it is possible to suppress the dispersion board from approaching the end plate when the stacked body is bent, and as a result, it is possible to suppress the stacked body from being excessively bent.

(8) In the battery pack according to the above-mentioned (7), the protrusion may be provided on an opposite side of the support member while having the second self-centering mechanism sandwiched therebetween.

According to the configuration, since the protrusions are provided on the side that is expected to bend relatively the most, the effect of suppressing excessive bending can be maximized.

(9) In the battery pack according to the above-mentioned (7) or (8), a tip surface of the protrusion may be separated away from a rear end surface of the protrusion as the tip surface approaches the support member.

According to the configuration, when the stacked body is bent, the entire tip surface of the protrusion can come into surface contact with the dispersion board or the end plate that approaches the protrusion. Since a contact area of the protrusion with the dispersion board or the end plate can be increased, excessive bending of the stacked body can be suppressed in a stable state.

(10) In the battery pack according to the above-mentioned (6) or (9), the stacked body and the second wall member may be separated from the support member.

According to the configuration, the undulation of the stacked body due to volume expansion or the like of the solid state battery cells is not disturbed by the contact with the support member. Accordingly, when the undulation of the stacked body is disturbed, it is possible to avoid the problem that stress occurs in the solid state battery cells in the stacked body and the solid state battery cells are damaged.

According to the aspect of the present invention, it is possible to provide the battery pack capable of suppressing bending or twisting of the battery module in all directions without imposing a load on the secondary battery cell, which in turn contributes to energy efficiency.

DETAILED DESCRIPTION OF THE INVENTION

Figure 1A:
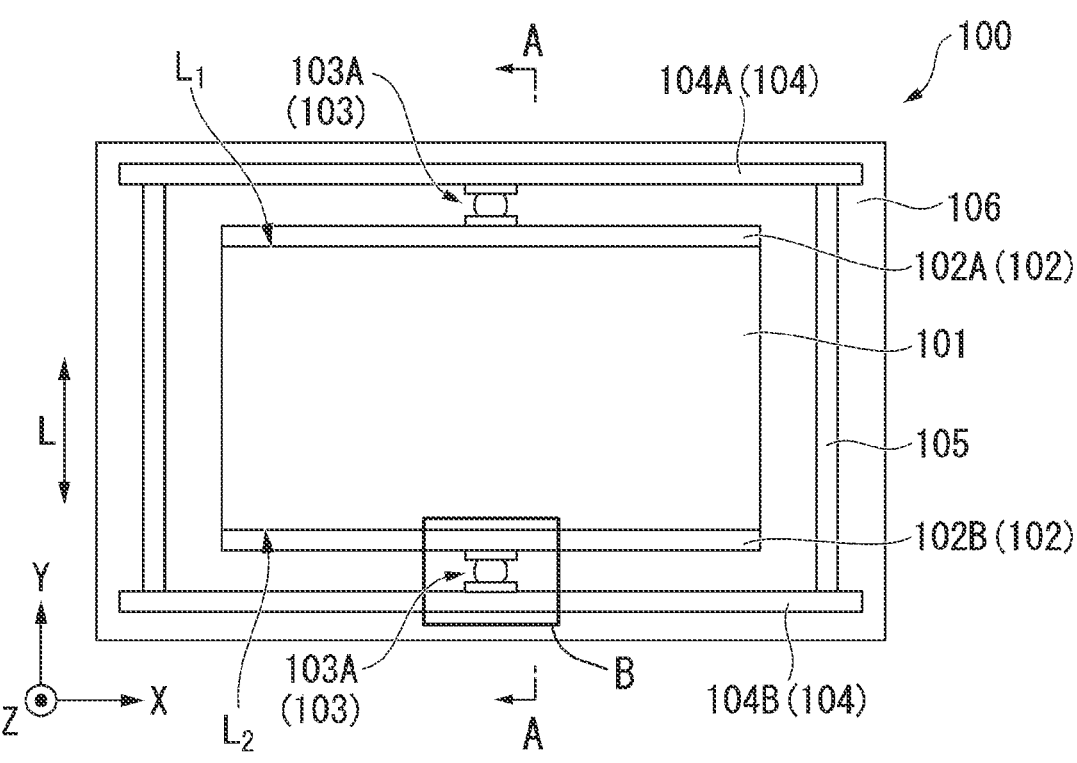
FIG. 1A is a plan view of a battery pack according to a first embodiment of the present invention.

Hereinafter, a battery pack according to an embodiment to which the present invention is applied will be described in detail with reference to the accompanying drawings. Further, in the drawings used in the following description, in order to make features easier to understand, characteristic portions may be shown enlarged for convenience, and dimensional ratios or the like of components may not necessarily be the same as the actual ones. In addition, materials, dimensions, or the like, exemplified in the following description are examples, and the present invention is not limited to them, and it is possible to change them appropriately without changing the scope of the present invention.

First Embodiment

Figure 1B:
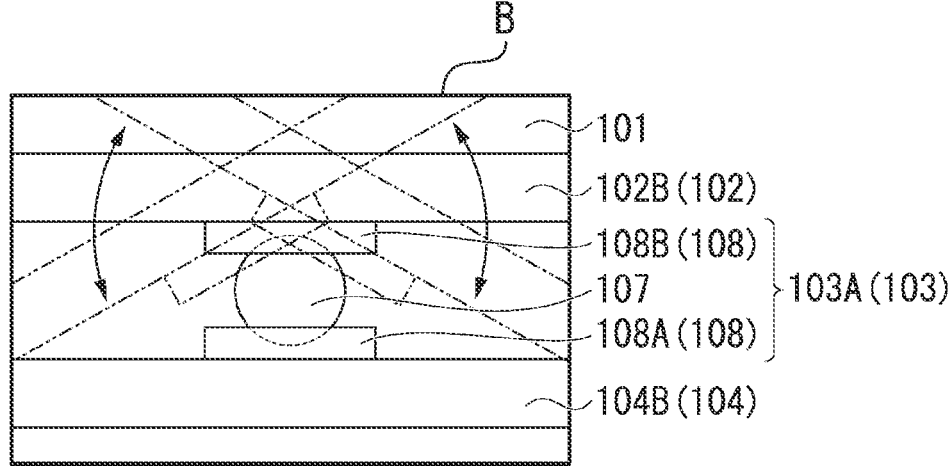
FIG. 1B is an enlarged view of a region adjacent to a self-centering mechanism in the battery pack of FIG. 1A.

FIG. 1A is a plan view of a battery pack 100 according to a first embodiment of the present invention. The battery pack 100 mainly includes a stacked body 101 of a plurality of solid state battery cells, a pair of end plates 102, a pair of self-centering mechanisms 103, a pair of first wall members 104, a connecting member 105, and a support member 106. FIG. 1B is an enlarged view of a region adjacent to a first self-centering mechanism 103 in the battery pack 100 of FIG. 1A.

The plurality of solid state battery cells (not shown) that constitute the stacked body 101 are stacked in a Y direction. The plurality of stacked solid state battery cells each includes a positive electrode current collector, a positive electrode active material, a solid electrolyte, a negative electrode active material, and a negative electrode current collector, and these are stacked to overlap each other directly or with another member sandwiched therebetween in a Y direction.

Any one of the pair of end plates 102 is connected to both ends of the stacked body 101 in a stacking direction L. A first end plate 102A on one side is disposed to come in contact with one end $L_1$ of a solid state battery cell 101 in the stacking direction L, and a second end plate 102B on the other side is disposed to come into contact with the other end $L_2$ in the same stacking direction.

A binding means (not shown) is pressed against a plurality of solid state battery cells 101 from both ends $L_1$ and $L_2$ via the first end plate 102A and the second end plate 102B in the stacking direction L and binds the solid state battery cell 101. As the binding means, for example, while a band-shaped means (a binding hoop or the like) that surrounds the stacked solid state battery cell 101 is exemplified, it may be another type. The first wall members 104 (104A, 104B) are connected to the end plates 102 (102A, 102B) of both ends of the stacked body 101, respectively, via the self-centering mechanisms 103 (the first self-centering mechanism 103A) on a side opposite to the stacked body 101. That is, the end plate 102A is connected to the first wall member 104A via the first self-centering mechanism 103A, and the end plate 102B is connected to the first wall member 104B via the first self-centering mechanism 103A. Each of the first wall members 104A and 104B are supported by the support member (pack) 106. The first wall member 104A and the first wall member 104B may be connected via one or two or more connecting members 105.

The self-centering mechanisms 103 are constituted by a spherical member 107 and two plate-shaped members 108 (108A, 108B) slidable on a surface of the spherical member 107, the plate-shaped member 108A is attached to the end plates 102, and the plate-shaped member 108B is attached to the first wall members 104. Both the plate-shaped members 108A and 108B have cavities on the surfaces that slide against the spherical member 107. A part of the spherical member 107 is fitted into the cavity of the plate-shaped member 108A, and the other part of the spherical member 107 is fitted into the cavity of the plate-shaped member 108B. The spherical member 107 is gripped while being sandwiched between the plate-shaped member 108A and the plate-shaped member 108B.

The end plates 102 and the stacked body 101 are fixed while coming into point contact with the first wall members 104 via the self-centering mechanisms 103. For this reason, the pressure due to twisting of the support member 106 is equalized in the self-centering mechanisms 103, and the solid state battery cells that constitute the stacked body 101 are subjected to the equal pressure from any angle.

From the viewpoint of maintaining the point contact state of the end plates 102 and the stacked body 101 with respect to the first wall members 104, the spherical member 107 is formed of a strong hardness material such as high speed steel, chromium molybdenum steel, or the like, or a hardness material such as SUS440C or SUS630 if it is SUS, and preferably has hardness greater than that of the first wall member. When the first wall members 104 is formed of SUS 304 (hardness 187: Vickers hardness HV conversion) or aluminum alloy (duralumin) (hardness 155), the spherical member 107 preferably has a hardness of 200 or more above them.

Figure 2:
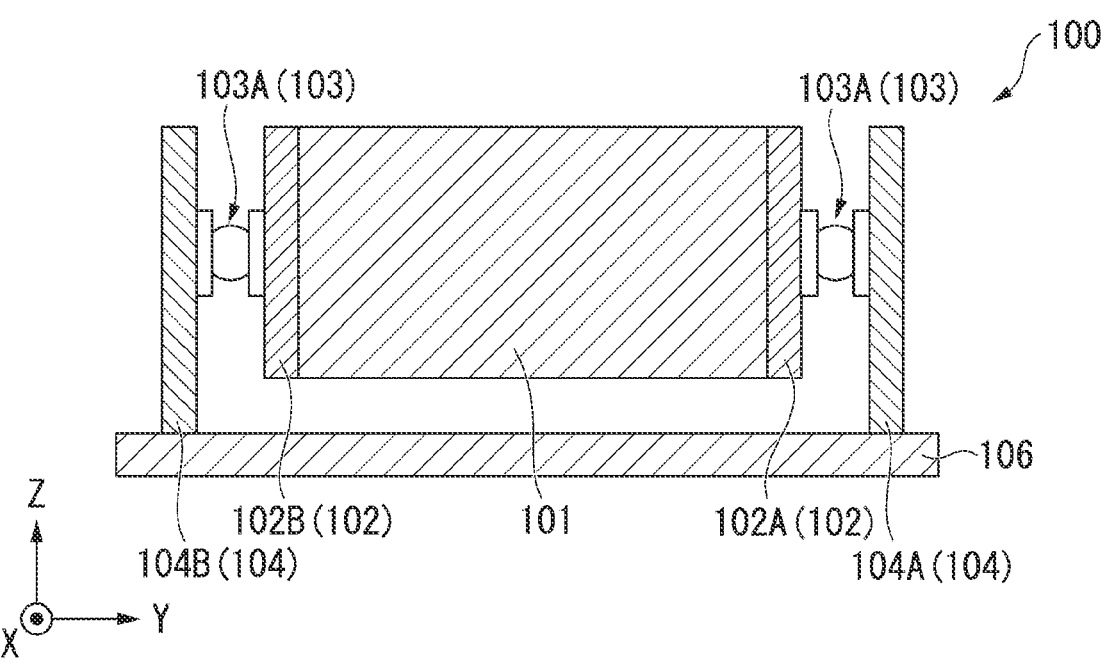
FIG. 2 is a cross-sectional view of a battery module according to the same embodiment.

FIG. 2 is a cross-sectional view when the battery pack 100 of FIG. 1A and FIG. 1B is cut along line A-A. The stacked body 101 undulates in all directions due to volume expansion or the like of the solid state battery cells. When such undulation is disturbed, a load may be applied to the solid state battery cells in the stacked body 101, and the solid state battery cells may be damaged. Here, at least the stacked body 101 and the end plates 102 are preferably spaced apart from the support member 106 so as not to disturb the undulation of the stacked body 101.

As described above, in the battery pack 100 of the embodiment, the stacked body 101 of the solid state battery cells is fixed to a fixing member such as a first wall member, a support member, or the like, via the self-centering mechanisms 103. Accordingly, since the stacked body 101 is in point contact with the fixing member, it is possible to attenuate and suppress bending or undulation of the stacked body 101 due to expansion or the like of the solid state battery cell 101 in all directions.

In addition, since the pressure due to twisting or the like transmitted from the side of the fixing member is equalized through the self-centering mechanisms 103 and the equal pressure is applied to the stacked body 101 from any angle, it is possible to realize a state in which a large load is not applied to the solid state battery cell. The embodiment can contribute to energy efficiency by providing such a battery pack 100.

Second Embodiment

Figure 3:
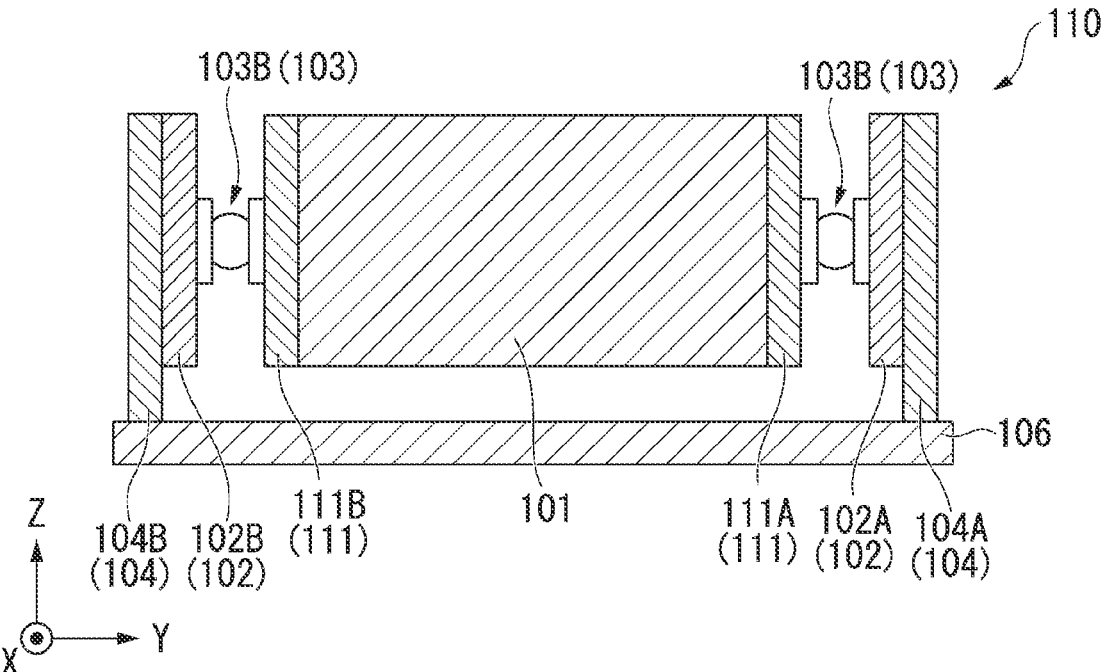
FIG. 3 is a cross-sectional view of a battery pack according to the second embodiment of the present invention.

FIG. 3 is a plan view of a battery pack 110 according to a second embodiment of the present invention. In the battery pack 110, dispersion boards (second wall members) 111 (111A, 111B) are connected to both ends of the stacked body 101 of the solid state battery cells in the stacking direction, respectively, and the self-centering mechanisms 103 (a second self-centering mechanism 103B) is attached between the dispersion boards 111 and the end plates 102 (102A, 102B). The end plates 102A and 102B are connected to the first wall members 104A and 104B supported by the support member 106, respectively. The dispersion boards 111 have a function of dispersing the pressure by the self-centering mechanisms 103B evenly over each end surface of the stacked body 101. The stacked body 101 and the dispersion boards 111 are preferably spaced apart from the support member 106. Another configuration of the battery pack 110 is the same as the battery pack 100, and exhibits at least the same effects as the battery pack 100. A place corresponding to the battery pack 100 is designated by the same reference sign.

The embodiment assumes a configuration in which the end plates 102A and 102B are fixed to the support member 106 via the first wall members 104A and 104B and the stacked body (the cell stack body) 101 including the self-centering mechanisms 103B on both ends is inserted between the fixed end plates 102A and 102B. The battery pack 110 of this form can be manufactured without generating a work for fastening the end plates 102 to the stacked body 101 while maintaining the load.

Third Embodiment

Figure 4:
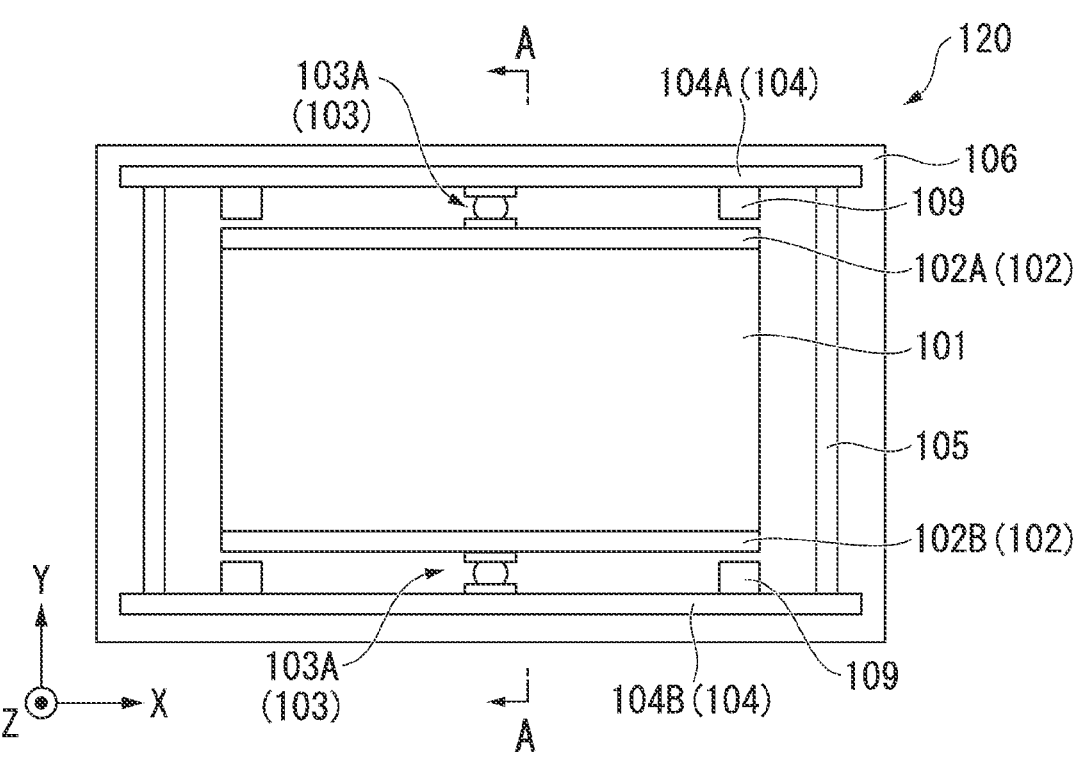
FIG. 4 is a plan view of a battery pack according to a third embodiment of the present invention.
Figure 5:
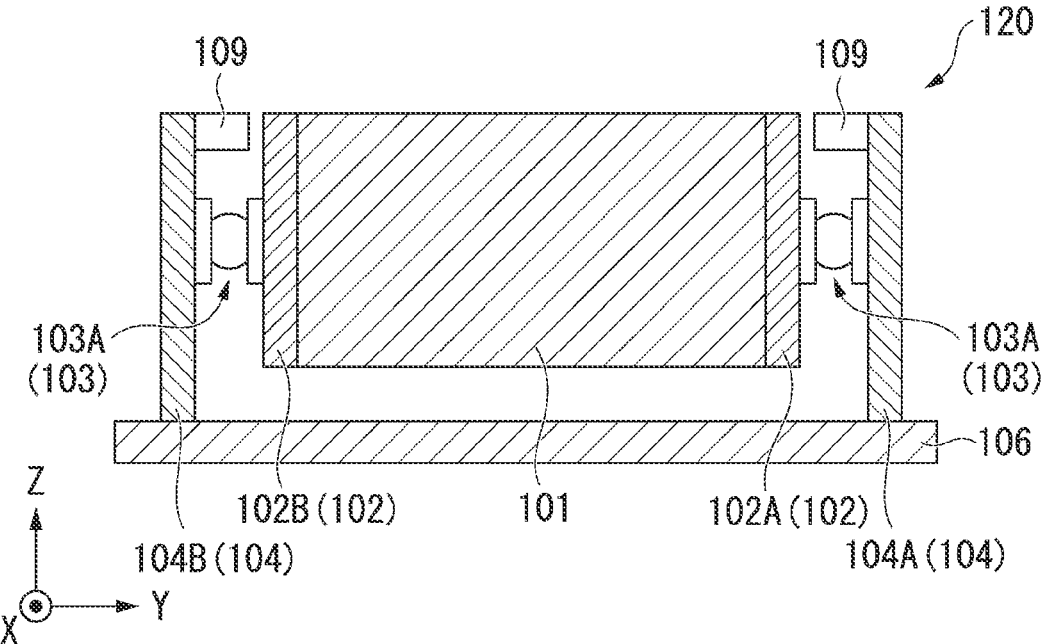
FIG. 5 is a cross-sectional view of the battery pack according to the same embodiment.

FIG. 4 is a plan view of a battery pack 120 according to a third embodiment of the present invention. FIG. 5 is a cross-sectional view when the battery pack 120 of FIG. 4 is cut along line A-A. The battery pack 120 includes protrusions 109 protruding from the end plates 102 or the first wall members 104 between the end plates 102 and the first wall members 104. Another configuration of the battery pack 120 is the same as the battery pack 100 and exhibits at least the same effects as the battery pack 100. A place corresponding to the battery pack 100 is designated by the same reference sign.

A configuration of the protrusion 109 shown in FIGS. 4 and 5 is an example. The protrusion 109 is connected to either one of the end plate 102 and the first wall member 104 and separated from the other. Here, the protrusion 109 has a rod shape (such as a columnar shape) extending in the Y direction, and a configuration in which one end is connected to the first wall member 104 and the other end is separated from the end plate 102 is exemplified. Since the protrusion 109 is provided, when the stacked body 101 is bent, the end plate 102 can be prevented from approaching the first wall member 104, and as a result, the stacked body 101 can be prevented from bending too much.

The bending of the stacked body 101 is limited in size on the side of the support member 106, but on the opposite side of the support member 106, the circumference is open, and therefore, it may be increased without limitation. Accordingly, it is preferable such that the protrusions 109 are provided on the side where the bending is relatively large, and it is most preferable such that the protrusions 109 are provided on the opposite side of the support member 106.

Figure 6:
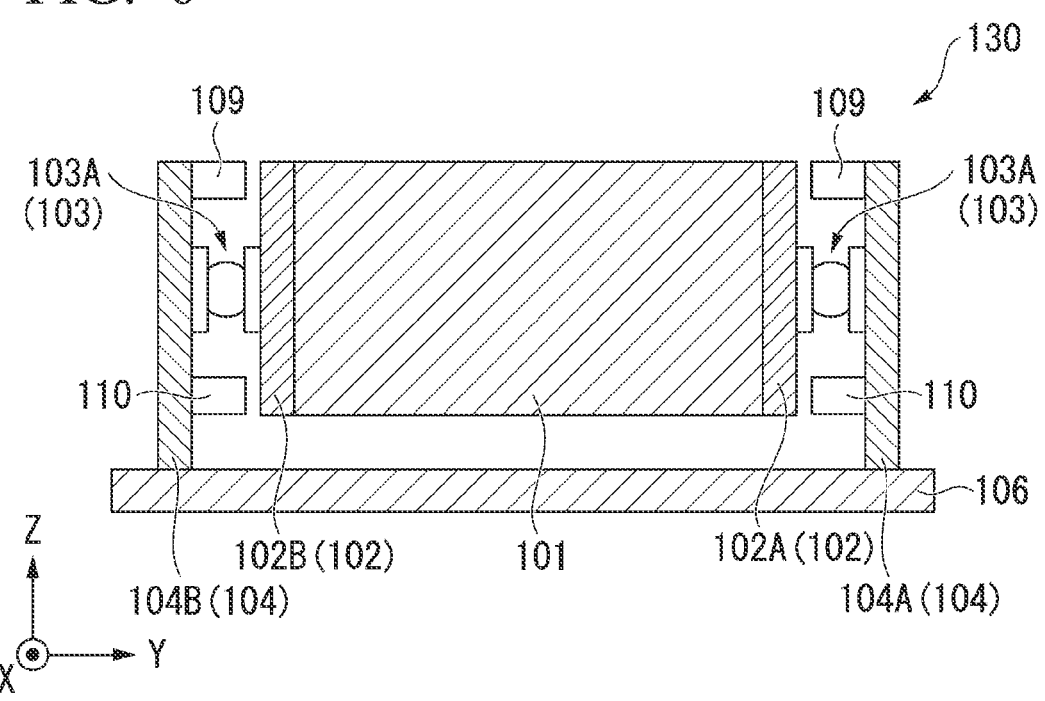
FIG. 6 is a cross-sectional view of a battery pack according to Variant 1 of the same embodiment.

FIG. 6 is a cross-sectional view of a battery pack 130 according to Variant 1 of the third embodiment. The protrusions 109 may be connected to a plurality of places between the first wall members 104 and the end plates 102. For example, as shown in FIG. 6, if it is connected to two places of the opposite side (upper side) of the support member 106 and the side (lower side) of the support member 106, not only the excessive undulation by the expansion of the stacked body 101 on the upper side but also the excessive undulation by the expansion on the lower side can be suppressed.

Figure 7:
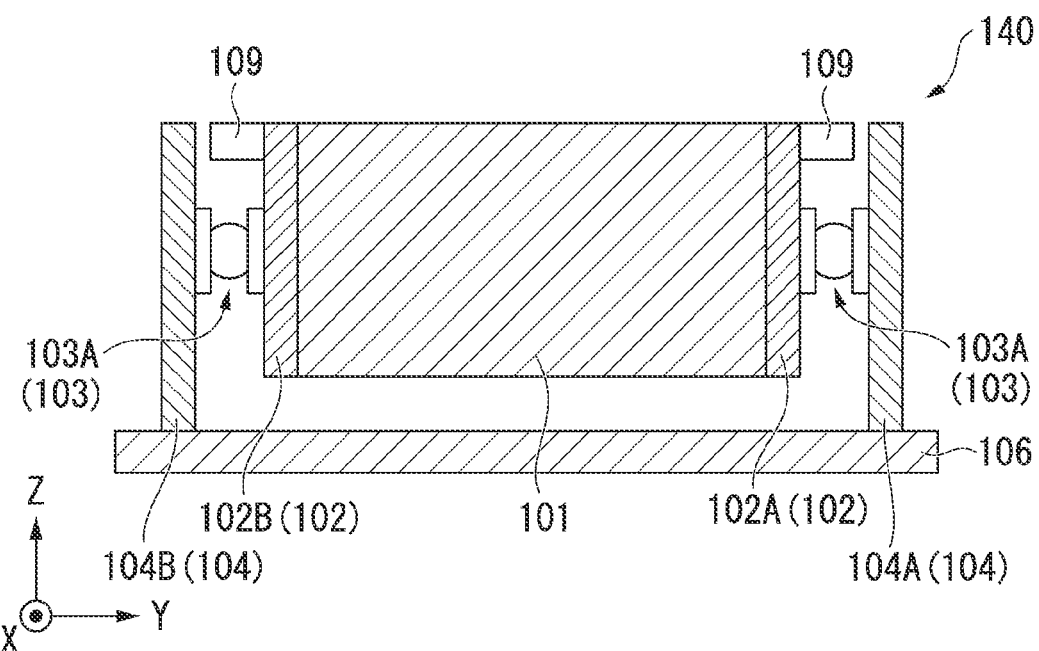
FIG. 7 is a cross-sectional view of a battery pack according to Variant 2 of the same embodiment.

FIG. 7 is a cross-sectional view of a battery pack 140 according to Variant 2 of the third embodiment. The protrusions 109 are not connected to the first wall members 104 and may be connected to the end plates 102. For example, as shown in FIG. 7, one ends of the protrusions 109 may be connected to the end plates 102 and the other ends may be spaced apart from the first wall members 104. Here, while the case in which the protrusions 109 are connected to only one place between the first wall members 104 and the end plates 102 is exemplified, like Variant 1, they may be connected to a plurality of places.

Figure 8:
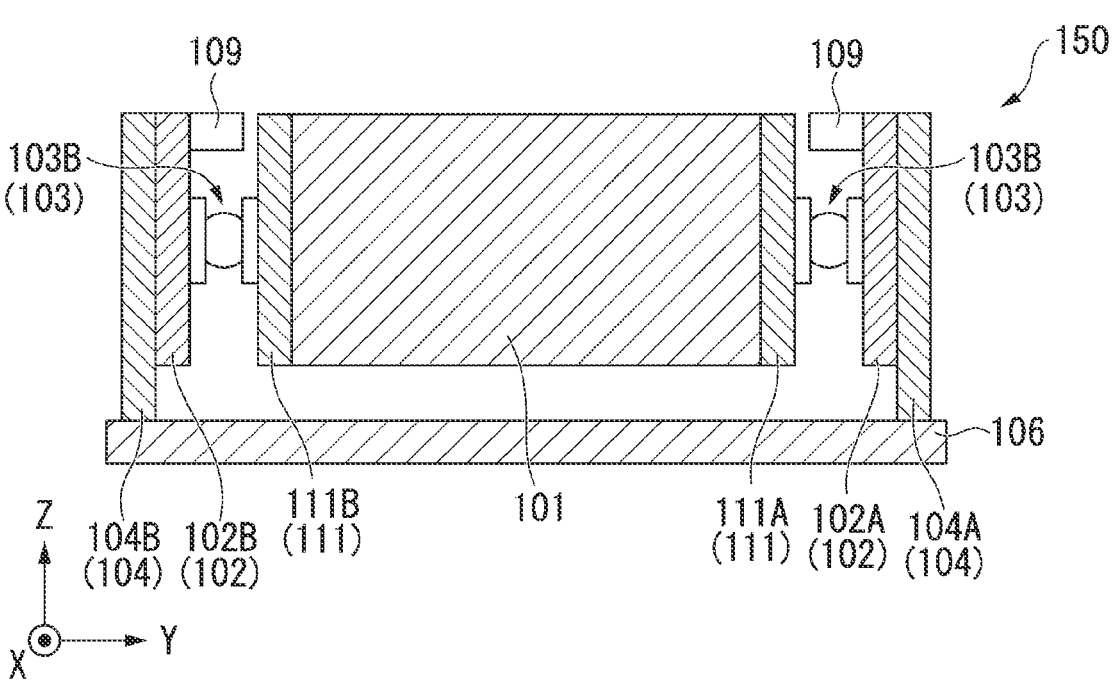
FIG. 8 is a cross-sectional view of a battery pack according to Variant 3 of the same embodiment.

FIG. 8 is a cross-sectional view of a battery pack 150 according to Variant 3 of the third embodiment. The self-centering mechanisms 103 may be provided on at least two places of the side of one end $L_1$ and the side of the other end $L_2$ of the stacked body 101. For example, like the second embodiment, the self-centering mechanisms 103 (the second self-centering mechanism 103B) may be provided between the dispersion boards 111 and the end plates 102. Here, while the case in which the protrusions 109 are connected to only one place between the dispersion boards 111 and the end plates 102 is exemplified, like Variant 1, they may be connected to a plurality of places.

Fourth Embodiment

Figures 9A, 9B:
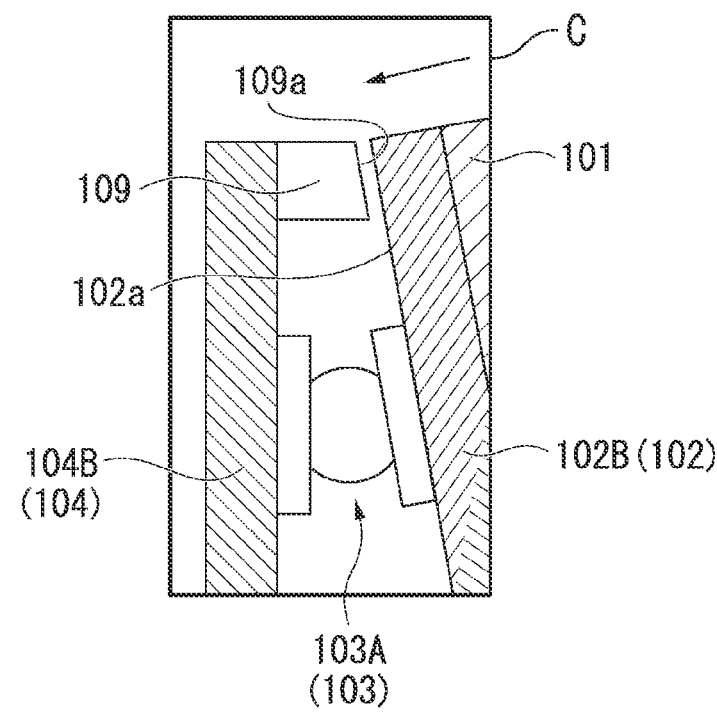
FIG. 9A is a cross-sectional view of a battery pack according to a fourth embodiment of the present invention.
FIG. 9B is an enlarged view of a region adjacent to a protrusion in the battery pack of FIG. 9A.

FIG. 9A is a cross-sectional view of a battery pack 160 according to a fourth embodiment of the present invention. A state in which the stacked body 101 is bent due to volume expansion or the like of the solid state battery cell and upper end portions of the end plates 102 approach the first wall members 104 is shown. FIG. 9B is an enlarged view of a region adjacent to the protrusions 109 in the battery pack 160 of FIG. 9A.

In the battery pack 160, among surfaces of the protrusions 109, tip surfaces 109a approaching (facing) upper end portions of the end plates 102 or the first wall members 104 are inclined in a normal direction (Z direction) of a surface of the support member 106. That is, the tip surfaces 109a of the protrusions 109 are inclined so as to separate away from rear end surfaces of the protrusions 109 (surfaces connected to the end plates 102 or the first wall members 104) as it approaches to the support member 106. Here, a case in which the tip surfaces 109a of the protrusions approaching the end plates 102 are inclined is exemplified. Another configuration of the battery pack 160 is the same as the battery pack 120 and exhibits at least the same effect as the battery pack 120. A place corresponding to the battery pack 120 is designated by the same reference sign.

Since the surface 109a of the protrusion is inclined in this way, the entire of the surface 109a of the protrusion can come into surface contact with a surface 102a of the end plate that rotates when the stacked body 101 is bent. That is, a contact area of the protrusion 109 with respect to the end plate 102 can be increased. Accordingly, in the embodiment, in comparison with the case in which the surface 109a of the protrusion is in partial contact with the surface 102a of the adjacent end plate 102, excessive bending of the stacked body 101 can be suppressed in a more stable state.

Further, an orientation (inclined direction) of the surface 109a in the embodiment is set assuming that the stacked body 101 is bent to the opposite side (upper side) of the support member 106 as shown in FIG. 9A. The protrusions 109 having different inclined surfaces may be used while assuming they are bent to the other side. For example, with respect to bending toward the side of the support member (lower side), the surface 109a that is inclined to be widen toward the stacked body 101 as it separates from the support member 106 is suitable, and the protrusions 109 having such surfaces 109a may be used.

Protrusions 110 closer to the support member 106 than the first self-centering mechanism 103A may be provided between the first wall members 104 and the end plates 102. In this case, curving (bending) of the stacked body 101 that makes the side of the support member 106 convex can be suppressed, and the curved stacked body 101 comes into contact with the support member 106, which can prevent a cell side surface portion in the stacked body 101 from being damaged.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A battery pack comprising:
   a stacked body of a plurality of solid state battery cells;
   end plates connected to both ends of the stacked body in a stacking direction, respectively;
   first wall members connected to the end plates on both ends via a first self-centering mechanism, respectively; and
   a support member configured to support the first wall member,
   wherein the first self-centering mechanism is constituted by a spherical member and two plate-shaped members slidable on a surface of the spherical member, one of the plate-shaped member is connected to the end plate, and other one of the plate-shaped member is connected to the first wall member.

2. The battery pack according to claim 1, wherein protrusions protruding from the end plates or the first wall members are provided between the end plates and the first wall members.

3. The battery pack according to claim 2, wherein the protrusion is provided on a side opposite to the support member while having the first self-centering mechanism sandwiched therebetween.

4. The battery pack according to claim 2, wherein a tip surface of the protrusion is separated away from a rear end surface of the protrusion as the tip surface approaches the support member.

5. The battery pack according to claim 2, wherein the stacked body and the end plate are separated from the support member.

6. A battery pack comprising:

a stacked body of a plurality of solid state battery cells;

second wall members connected to both ends of the stacked body in a stacking direction, respectively;

end plates connected to the second wall members on both ends via a second self-centering mechanism, respectively;

first wall members connected to the end plates; and a support member configured to support the first wall members, wherein the second self-centering mechanism is constituted by a spherical member and two plate-shaped members slidable on a surface of the spherical member, one of the plate-shaped member is connected to the second wall member, and other one of the plate-shaped member is connected to the end plate.

7. The battery pack according to claim 6, wherein protrusions protruding from the second wall members or the end plates are provided between the second wall members and the end plates.

8. The battery pack according to claim 7, wherein the protrusion is provided on an opposite side of the support member while having the second self-centering mechanism sandwiched therebetween.

9. The battery pack according to claim 7, wherein a tip surface of the protrusion is separated away from a rear end surface of the protrusion as the tip surface approaches the support member.

10. The battery pack according to claim 6, wherein the stacked body and the second wall member are separated from the support member.

* * * * *